United States Patent [19]

Kitchens

[11] 3,860,635
[45] Jan. 14, 1975

[54] SUBSTITUTED NORBORNYL AND NORTRICYCLYL DERIVATIVES AND THEIR USE IN PERFUMERY

[75] Inventor: Garry C. Kitchens, Wayne, N.J.

[73] Assignee: Givaudan Corporation, Clifton, N.J.

[22] Filed: Oct. 6, 1969

[21] Appl. No.: 864,158

[52] U.S. Cl.......... 260/488 B, 252/522, 260/497 R, 260/586 R, 260/611 F
[51] Int. Cl.. C07c 35/22, C07c 35/28, C07c 69/14, C07c 69/06, C07c 69/24
[58] Field of Search............ 260/488 B, 489, 617 F, 260/586 R, 497 R

[56] References Cited
UNITED STATES PATENTS

| | | | |
|---|---|---|---|
| 1,420,399 | 6/1922 | Andreau | 260/489 |
| 1,838,465 | 12/1931 | Stephan | 260/489 |
| 2,738,356 | 3/1956 | Soloway et al. | 260/410 |
| 3,345,419 | 10/1967 | Tinsley et al. | 260/617 F |

OTHER PUBLICATIONS

Chem. Abstracts, 64:14048g.
Chem. Abstracts, 62:11856h.
Chem. Abstracts, 57:12343c.
Chem. Abstracts, 58:1369d.
Berson et al., J.A.C.S., 89, May, 1967, pp. 2563–2568.
Chem. Abstracts, 55:7311b.

Primary Examiner—Vivian Garner
Attorney, Agent, or Firm—Thomas Cifelli, Jr.

[57] ABSTRACT

Novel derivatives of substitute norbornane and nortricyclene are derived from 5-ethylidene-2-norbornane by reaction with organic acids in the presence of protonating catalysts.

The novel derivatives have the structural formlulae:

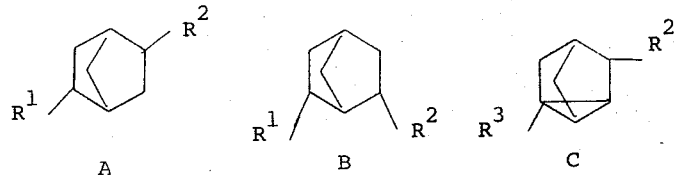

A    B    C in which
$R^1$ represents an ethylidene or an ethyl group;
$R^2$ represents an acyloxy radical derived from an alkanoic acid containing up to 5 carbon atoms, a hydroxyl group, or an oxygen group;
$R^3$ represents an ethyl group; and mixtures thereof.

11 Claims, No Drawings

SUBSTITUTED NORBORNYL AND NORTRICYCLYL DERIVATIVES AND THEIR USE IN PERFUMERY

BACKGROUND OF THE INVENTION

This invention is concerned with a new group of derivatives of tricyclo $(2.2.1.0^{2.6})$ heptanes and bicyclo (2.2.1) heptanes which are useful in perfumery. Included in this group are novel alcohols, esters and ketones.

Derivatives of tricyclo $(2.2.1.0^{2.6})$ heptanes (nortricyclenes) and bicyclo (2.2.1) heptanes (norbornanes) have been known for many years but none has been useful in formulating perfumes. These derivatives as described in U.S. Pat. No. 2,738,356, U.S. Pat. No. 3,345,419, British Patent Specification 717,010, J. Am Chem. Soc., 89, 2563–69 (1967), J. Am. Chem. Soc. 82, 6362–66 (1960), J. Am. Chem. Soc. 84, 3918–25 (1962), which include alcohols, esters and ketones, have camphoraceous, chemical and pungent odors and therefore are not useful for the formulation of perfumes. It was therefore unexpected to find that our novel compounds had a wide variety of unusual, interesting, and useful odors, such as fatty, spicy, fruity, floral, citrus, woody, green and rosey odors. The novel compounds are useful in the preparation of all types of perfumes, such as colognes, single florals and fancy perfumes.

Specific evidence of the unexpected utility of the novel compounds of this invention as compared with the compounds disclosed in U.S. Pat. No. 2,738,356, is afforded by Examples XII through XVI, infra. When the esters disclosed in U.S. Pat. No. 2,738,356, are substituted for the novel compounds of this invention, the resulting compositions have no perfume utility.

It must also be kept in mind that chemicals for perfumery use must not only possess desirable odors; they must have other properties, such as non-toxicity in the amounts used and non-sensitivity to the skin. While the novel compounds of this invention meet these requirements, this was unexpected as may be seen by reference to S. Winstein, J.A.C.S., 83, 1516 (1961) where it is reported that several derivatives with the same ring-carbon skeleton as that of the novel compounds of this invention show skin sensitivity reactions and are quite toxic.

It is known (H. C. Brown, Chem. Eng. News, 45, 87–97 (1967) that norbornadiene in the presence of acids exists as both norbornenyl and tricyclene (tricyclo $(2.2.1.0^{2.6})$ heptanyl carbonium ions.

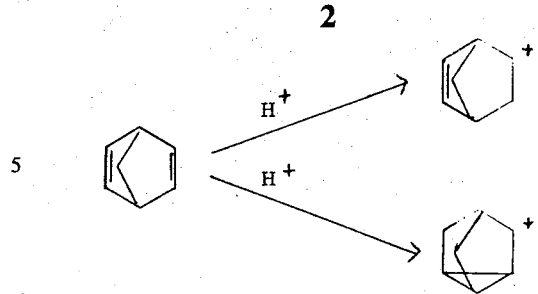

It is also known that norbornadiene reacts with organic acids (H. C. Brown, Chem. Eng. News, 45, 95 (1967): U.S. 2,738,356, (March 13, 1956) in the presence of protonating acids to yield tricyclo $(2.2.1.0^{2.6})$ heptyl and norbornenyl derivatives.

In the presence of protonating acids, ethylidenenorbornene exists as a mixture of carbonium ions which will react with organic acids to yield a mixture of esters. In addition reactions to the norbornadiene system, it is known that the least thermodynamically-stable endo isomer is formed and which is equilibrated to the more stable exo isomer, giving a mixture of the isomers.

SUMMARY OF THE INVENTION

This invention involves the provision of novel derivatives of norbornane and nortricyclene. The novel compounds are derived from the readily available, cheap, petrochemical, ethylidenenorbornene in good yields. They are therefore, cheap perfume materials which are in demand for perfume manufacture.

DETAILED DESCRIPTION OF THE INVENTION

This invention relates to the preparation of derivatives of the commercially available hydrocarbon, 5-ethylidene2-norbornene, which has the following structure:

The compounds of this invention are represented by the aforesaid formulae set forth under "Abstract of the Disclosure."

The compounds of this invention, except for the ketones, can exist in both the endo and exo isomeric forms. This is exemplified as follows:

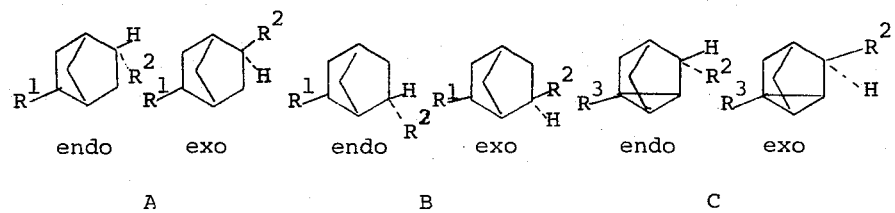

A  B  C

In accordance with the process of this invention, the novel esters of the invention are prepared by the reaction of 5-ethylidene-2-norbornene with an appropriate organic acid in the presence of protonating acids to yield a mixture of esters.

The following equation schematically illustrates the process of that part of the invention pertaining to the preparation of the novel esters herein:

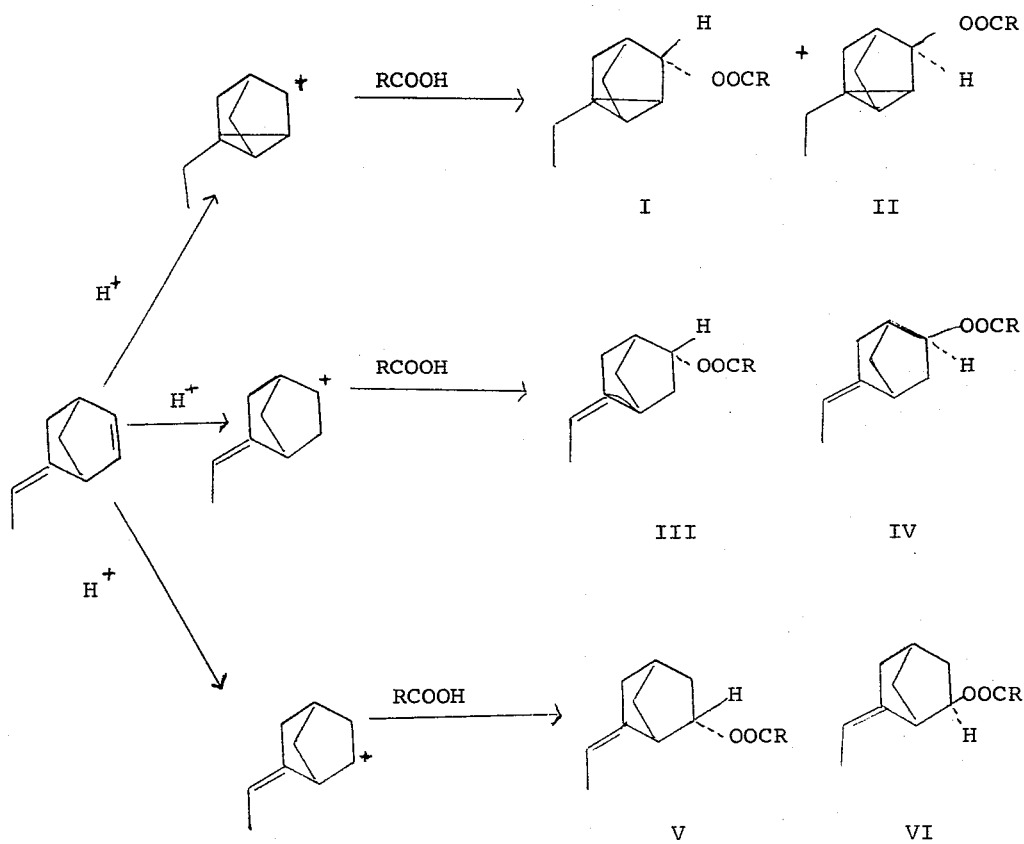

In carrying out the aforesaid process, a mixture of esters of this invention, consisting of I through VI, i.e., endo and exo-6-ethyltricyclo $(2.2.1.0^{2.6})$ hept-3-yl esters (I and II) and endo and exo-5-ethylidenenorborn-2 and 3-yl esters (III, IV, V, VI), is obtained.

In addition to the above reactions, schematically set forth, a side reaction occurs in which a portion of the esters III, IV, V and VI is further protonated and reacts with an additional molecule of an organic acid to form diacyloxy esters which, on heating, usually during distillation, are converted back to the monoesters (III, IV, V, VI):

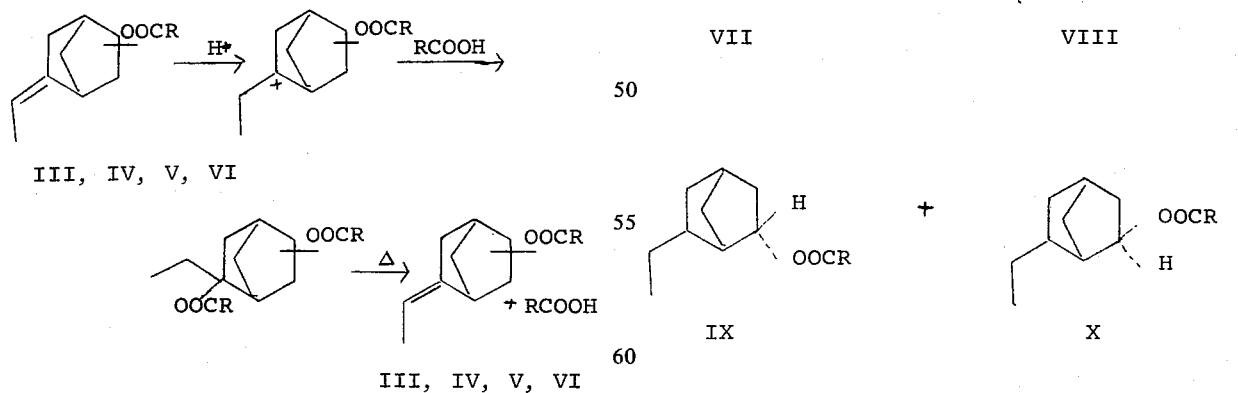

Another mixture of esters may be obtained by hydrogenating the above mixture of esters containing I, II, III, IV, V and VI. The endo and exo 6-ethyltricyclo $(2.2.1.0^{2.6})$ hept-3-yl esters (I and II) are recovered unchanged and the endo and exo-5-ethylidenenorborn-2 and 3-yl esters (III, IV, V, VI) are converted to the corresponding endo and exo-5-ethylnorborn-2 and 3-yl esters (VII, VIII, IX and X), respectively. The formulae of the latter are given below:

The preparation of the mixture of alcohols and ketones, in accordance with this invention, can be represented schematically, as follows:

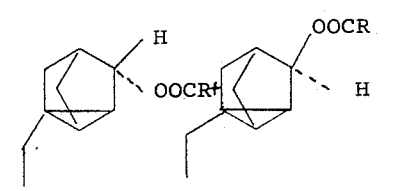

I  II

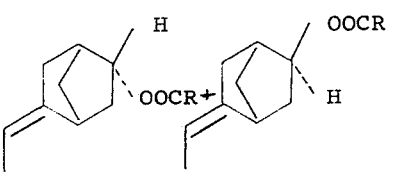

III  IV

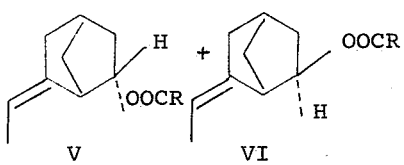

V  VI

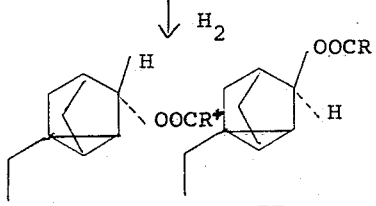

I  II

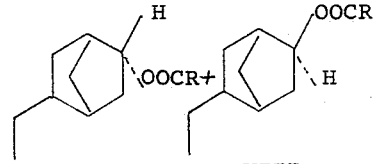

VII  VIII

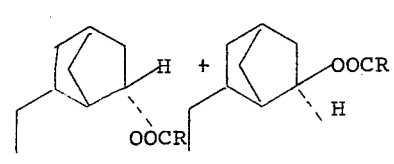

IX  X

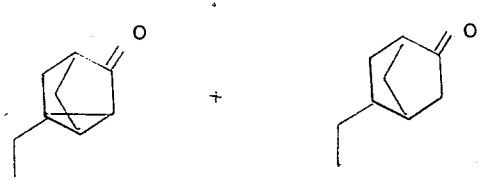

XXI  XXII

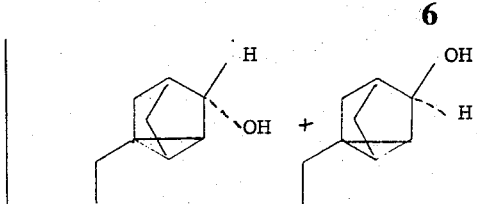

XI  XII

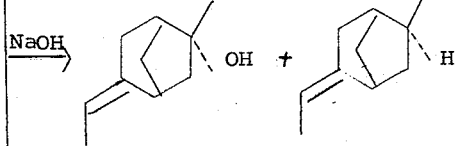

XIII  XIV

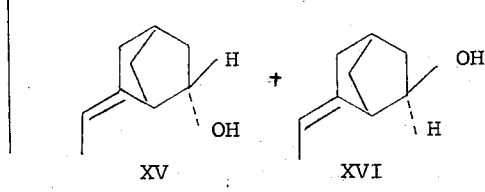

XV  XVI

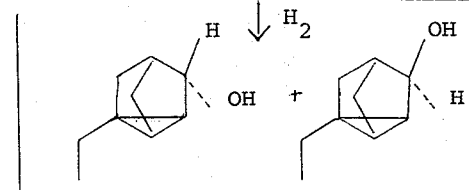

XI  XII

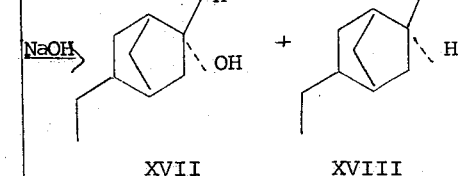

XVII  XVIII

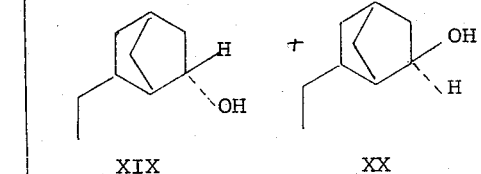

XIX  XX

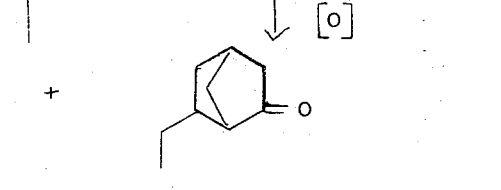

XXIII

One mixture of alcohols of this invention which may be prepared is endo and exo-6-ethyltricyclo (2.2.1.0$^{2,6}$) heptan-3-ol (XI, XII) and endo and exo-5-ethylidenenorborn-2 and 3-ols (XIII, XIV, XV, XVI) prepared by the saponification of the esters I, II, III, IV, V, VI, respectively.

Another mixture of alcohols of this invention which may be prepared is endo and exo-6-ethyltricyclo (2.2.1.0$^{2,6}$) heptan-3-ol (XI, XII) and endo and exo-5-ethylnorbornan-2 and 3-ol (XVII, XVIII, XIX, XX), prepared by the saponification of the mixture of partially hydrogenated esters I, II, VII, VIII, IX and X, respectively.

A mixture of ketones of this invention consists of a mixture of 6-ethyl-tricyclo (2.2.1.0$^{2,6}$) heptan-3-one XXI and 5-ethylnorborn-2 and 3-bornanone XXII, XXIII, prepared by the oxidation of the mixture of alcohols XI, XII, XVII, XVIII, XIX and XX.

In the reaction of ethylidenenorbornene with organic acids any protonating catalyst, such as formic, sulfuric, phosphoric, toluenesulfonic, boran trifluoride, boron trifluoride etherate, boron trifluoride hydrate and acid resins may be used as catalysts for the reaction. In the reaction of formic acid with ethylidenenorbornene, no additional catalyst is needed.

The amount of catalyst is not critical. I prefer to use about 1–5% catalyst, based on the amount of organic acid used. If desired, smaller or greater amounts of catalyst may be used. For example, amounts as low as 0.1% or as high as 50%, on the aforesaid basis may be used. The use of low amounts of catalyst results in slow reactions (i.e., long reaction periods); the use of large amounts of catalyst not only may speed the reaction unduly, but is uneconomic.

The ratio of organic acid to ethylidenenorbornene is not critical. However, large molar excesses of organic acids favor the reaction. The use of 1 to 5 moles of organic acid per mole of ethylidenenorbornene is preferred.

The reaction temperature is not critical. Temperatures of 20°C or below give slow reactions while at 150°C the yields are poor. Under the preferred conditions a reaction temperature to 50°C to 100°C is preferred.

The conditions for the saponification of the esters of this invention are not critical and can be carried out by known procedures, such as refluxing with aqueous or alcoholic sodium or potassium hydroxide.

The conditions for hydrogenation of the esters or alcohols of the invention are not critical. The hydrogenations can be accomplished without the use of a solvent or in solvents such as benzene, toluene or alcohols, with 1–5% Raney nickle or 1–2% of 5% palladium on charcoal catalyst, 50 to 250 lb. per square inch hydrogen pressure and a temperature of 50° to 150°C.

The conditions for the oxidation of the alcohols to the ketones of this invention are not critical and can be carried out by any known method for the oxidation of alcohols to ketones. For example, the known use of sodium dichromate and sulfuric acid as oxidation catalyst at 30°–50°C is preferred.

The mixtures of this invention possess unusual odor characteristics and are valuable perfume materials. The components of the mixtures can be separated by vacuum distillation and the various isomers have very interesting odors. The products of this invention are also valuable as intermediates for the synthesis of other perfume ingredients.

The structures of the components of the mixtures of this invention are based on chemical reactions, thermodynamic considerations, physical data, such as vapor phase chromatography (VPC), infrared absorptions and nuclear magnetic resonance spectrocopy.

In order to illustrate this invention further, the following examples are given. Examples I through XI teach the preparation of the novel materials named in the titles of each of said examples. Examples XII through XVI teach perfume formulations embodying the novel materials of this invention.

EXAMPLE I

6-Ethyltricyclo (2.2.1.0$^{2.6}$) hept-3-yl and
5-Ethylidenenorborn-2 and 3-yl Acetates.

A reaction flask equipped with an agitator, thermometer, dropping funnel and a condenser is charged with
 180 g. acetic acid
 6 g. sulfuric acid (96%)
 1 g. water The contents were agitated and heated to 50°C and 120.4 g. ethylidenenorbornene was fed in at 50°C over a 30 minute period with slight cooling. The batch was agitated at 60°C for 3 hours. 300 ml. of water and 100 ml. benzene were added and agitated 5 minutes. The batch was allowed to settle and the lower acid layer separated. The acid layer was extracted 3 × 50 ml. benzene and acid layer discarded. The benzene layers combined and washed 3 × 50 ml. of water and then neutralized using 10% NaHCO$_3$. The benzene was distilled off under reduced pressure leaving a residual 171.5 g. of crude esters. The crude was vacuum distilled at 6.0 mm. using a 27 cm. column packed with glass helices, and there was obtained 1) a 12 g. fraction, B.P. 26°–84°C/6 mm., 2) 121 g. esters, B.P. 84°–88°C/6 mm., 3) 16 g. esters, B.P. 88°–95°C/6 mm., and 14 g. of residue.

The 121 g. esters, fraction 2, was redistilled at 5 mm. as above and gave 1) 14 g. esters B.P. 81°–83°C/5 mm., 2) 106 g. esters B.P. 83°–94°C/5 mm. and 1.5 g. residue. Redistillation of fractions 1 and 3 from the first distillation with fraction 1 of second distillation gave an additional 25.2 g. of product, which was combined with fraction 2 from the second distillation. The total yield was 131.2 g. (72.2% of theory) of desired product which analyzed as follows:

| | |
|---|---|
| Saponification value | 307.7 |
| $n_D^{20}$ | 1.4737 |
| Sp. Gr. 25°C/25°C | 1.0127 |

The product possesses a green, fatty, citrus odor with a note of peach.

(Mixture): The IR-spectrum (neat) shows, among others, a strong broad band at around 5.72$\mu$, typical for the carbonyl group in the ester, and a broad absorption in the 8$\mu$ region for acetoxy. The N.M.R.-spectrum in CDCl$_3$ discloses the expected signals, e.g. a singlet at 2.0 ppm, typical for the methyl of the acetyl group.

Vapor phase chromatography (VPC), 150°C SE 30 columns showed that 5 components were present in the following percentage by weight:
 1 – 8.9
 2 – 28.3
 3 – 6.4
 4 – 12.0
 5 – 44.4

The hydrogenation of the mixture of this example established that the components 1 and 2, as shown by VPC were not hydrogenated and are ethyltricyclo (2.2.1.0$^{2.6}$) heptyl derivatives while components 3, 4 and 5 are unsaturated and are hydrogenated to saturated esters. Thus, components 3, 4 and 5 are ethylidenenorbornyl derivatives.

The Saponification of the desired product from the reaction of ethylidenenorbornene and acetic acid in the presence of a protonating catalyst gave a mixture of alcohols consisting, as shown by VPC, of five components:
 1. 11.1%, 2. 35.1% 3. 3.0% 4. 40.5% 5. 10.3%.

Hydroboration of ethylidenenorbornene gave mainly one isomer identical to component 4 in the alcohol mixture. Hydrogenation of the mixture of alcohols resulted in the hydrogenation of components 3, 4 and 5 giving a mixture shown by VPC as consisting of four components:
 1. 7.0%, 2. 26.6%, 3. 48.2%, 4. 18.2%
(components 3 and 4 being the hydrogenated products of 3, 4 and 5 above). The oxidation of the mixture of hydrogenated alcohols gave a mixture of ketones which was shown by VPC to consist of mainly (96.4%) of two ketones (13.8 and 82.6%) and a minor ketone (2%). This data indicated that the mixture is mainly two pairs of endo and exo isomers, one ethyltricyclo (2.2.1.0$^{2.6}$)

heptyl pair, and one ethylnorbornyl pair, and one minor ethylnorbornyl pair.

The components of the mixture of the acetates were separated by vacuum distillation using a Nester/Faust NAF 100 spinning band column.

Additional data relative to the foregoing five components are given in the following table:

|  | Component 1 | Component 2 | Component 4 | Component 5 | Component 3 |
|---|---|---|---|---|---|
|  | Isomer A(I)* | Isomer B(II)* | Isomer C(V)* | Isomer D(VI)* | Isomer U(IV)* |
| B. P. | 76.5°C/5 mm. | 81.5°C/5 mm. | 85.5°C/5 mm. | 86.5°C/5 mm. | 83.0°C/5 mm. |
| Purity (VPC) | 100% | 100% | 100% | 100% | 95% |
| Purity** | 100% | 100% | 100% | 100% | 100% |
| $n_D^{20}$ | 1.4610 | 1.4639 | 1.4780 | 1.4788 | 1.4791 |
| % C | 73.26 | 73.25 | 73.24 | 73.18 | 73.29 |
| % H | 9.07 | 9.01 | 9.12 | 9.09 | 9.10 |
| Calc. for $C_{11}H_{16}O_2$ |  |  |  |  |  |
| % C | 73.30 | 73.30 | 73.80 | 73.30 | 73.30 |
| % H | 8.95 | 8.95 | 8.95 | 8.95 | 8.95 |

*R = $CH_3$
**From saponification value.

(Isolated Isomers): The IR-spectrum and the N.M.R. spectrum of each pure isomer show the expected bands and signals, comparable with the assigned structure and in accordance with the original mixture.

EXAMPLE II

6-Ethyltricyclo $(2.2.1.0^{2.6})$ hept-3-yl and 5-Ethylidenenorborn-2 and 3-yl Propionates.

A reaction flask equipped with an agitator, thermometer, dropping funnel and a condenser is charged with 444 g. Propionic acid
12 g. Sulfuric acid 96%
2 g. Water The contents were agitated and heated to 60°C and 240.4 g. ethylidenenorbornene was fed in at 60°C over a 30 minute period with slight cooling. The batch was agitated at 60°C for 5 hrs. 600 ml. of water and 200 ml. benzene were added and agitated 5 minutes. The batch was allowed to settle and the lower acid layer separated. The acid layer was extracted 2 × 50 ml. benzene and acid layer discarded. The benzene layers were combined and washed 3 times with 100 ml. of water and then neutralized using 10% $NaHCO_3$. The benzene was distilled off under reduced pressure leaving a residual 350 g. of crude esters. The crude was vacuum distilled at 3.0 mm. using a 37 cm. column packed with glass helices and the following fractions were collected:

1. 9.0 g., B.P. 68°–82°C/3 mm., 2. 285 g., B.P. 82°–95°C/3 mm., 3. 16 g., B.P.. 95°–108°C/3 mm. and 28 g. residue.

Fraction 2, 285 g. was dissolved in hexane and neutralized with 10% sodium bicarbonate. The aqueous layer was withdrawn and the hexane was removed by distillation and the residual material was redistilled as above at 0.3 mm. The following fractions were collected:

1. 4.5 g., B.P. 50°–58°C/0.3 mm., 2. 16 g., B.P. 58°–62°C/0.3 mm., 3. 241.5 g., B.P. 62°–64°C/0.3 mm., 4. 20 g. B.P. 66°–70°C/0.3 mm. and 2.0 g. residue.

The redistillation of the fractions (1 and 3 from the first distillation and 1, 2 and 4 from the second distillation) gave an additional 43.6 g. of desired product. The total yield, fraction 3, 241.5 g. plus 43.6 g. was 285.1 g. (61% of theory). The product analyzed as follows:

| Saponification value | 287 |
|---|---|
| $n_D^{20}$ | 1.4728 |
| Sp. Gr. 25°C/25°C | 0.9923 |

The product has a fresh green woody odor, with notes of sassafrass, anethole, and a slightly fruity character.

VPC (175°C - SE 30 column) showed 4 components as follows:

1. 8.2%, 2. 25.0%, 3. 15.4%, 4. 51.4%

THE IR-spectrum (neat) shows a strong band at 5.75μ typical of carbonyl absorption, and a broad band in the 8.4μ region for propionate. The N.M.R. (60 mec $CDCl_3$) shows the expected signals.

EXAMPLE III

6-Ethyltricyclo $(2.2.1.0^{2.6})$hept-3-yl and 5-Ethylidenenorborn-2 and 3-yl Butyrates.

264.3 g. Butyric acid
6.0 Sulfuric acid (96%)
1.0 g. Water
120.2 g. Ethylidenenorbornene was processed as described in Example I. The crude esters amounted to 195 g. and were purified by distillation as described in Example II. There was obtained 156.2 g., B.P. 73°C/0.5 mm., of desired product, 10.8 g. B.P. 40°–74°C/0.5 mm. of fractions and 18.5 g. of residue. The yield was 75% of theory and the product analyzed as follows:

| Saponification value | 267.2 |
|---|---|
| $n_D^{20}$ | 1.4700 |
| Sp. Gr. 25°C/25°C | 0.9796 |

The product has a green, fatty and buttery odor. VPC (200°C, 20 M column) showed 4 components as follows:

1. 8.8%, 2. 29.1%, 3. 18.3%, 4. 43.8%

The IR-spectrum (neat) shows a strong band at 5.78μ typical of carbonyl absorption, and a broad band in the 8.5μ region for butyrates. The N.M.R. (60 mec $CDCl^3$) shows the expected signals.

EXAMPLE IV

6-Ethyltricyclo $(2.2.1.0^{2.6})$ hept-3-yl and 5-Ethylidenenorborn-2 and 3-yl iso-Butyrates.

264.3 g. iso-Butyric acid
6.0 g. Sulfuric acid
1.0 g. Water
120.2 g. Ethylidenenorbornene was processed as described in Example I. The crude esters amounted to 180 g. The crude was purified as described in Example II by vacuum distillation and gave 131.8 g. (63.2% of theory), B.P. 63°–65°C/0.6 mm., of desired product, 6.2 g. fractions, B.P. 50°–67°C/0.6 mm. and 32.5 g. of residue. The desired product analyzed as follows:

| | |
|---|---|
| Saponification value | 266.7 |
| $n_D^{20}$ | 1.4650 |
| Sp. Gr. 25°C/25°C | 0.9730 |

The odor of the product is green, fruity-rosy, resembling geranyl acetate.

VPC No. 3141 (175°C, 20 M column) showed 4 components as follows:

1. 9.6% 2. 28.4% 3. 18.1% 4. 43.9%

The IR-spectrum (neat) shows a strong band at 5.72$\mu$, typical of carbonyl absorption, and a broad doublet at 8.3 and 8.6$\mu$ for iso-butyrates. The N.M.R. (60 mec CDCl$_3$) shows the expected signals.

EXAMPLE V

6-Ethyltricyclo (2.2.1.0$^{2.6}$) hept-3-yl and 5-Ethylidenenorborn-2 and 3-yl Pivalates.

306.4 g. Pivalic acid
6.0 g. Sulfuric acid (96%)
1.0 g. Water
120.2 g. Ethylidenenorbornene was processed as described in Example I. The crude esters amounted to 204 g. The crude esters were purified by vacuum distillation as described in Example II and gave 167.8 g. (75.3% of theory), B.P. 67°–69°C/0.5 mm. of desired product, 9.2 g. B.P. 33°–72°C/0.5 mm. of fractions and 15.0 g. of residue. The product analyzed as follows:

| | |
|---|---|
| Saponification value | 245.1 |
| $n_D^{20}$ | 1.4645 |
| Sp. Gr. 25°C/25°C | 0.9521 |

VPC (175°C, 20 M column) showed 3 components as follows:

1. 15.5%, 2. 15.3%, 3. 69.2%

The product possesses an oily, floral odor with a note of rose.

The IR-spectrum (neat) shows a strong band at 5.8$\mu$, typical of carbonyl absorption, and a broad band in the 8.7$\mu$ region for pivalates. The N.M.R. (60 mec CDCl$_3$) shows the expected signals.

EXAMPLE VI

6-Ethyltricyclo (2.2.1.0$^{2.6}$) hept-3-yl and 5-Ethylidenenorborn-2 and 3-yl Formates.

A reaction flask equipped with an agitator, thermometer, dropping funnel and a condenser was charged with 70 g. of 98% formic acid and the contents were heated to 70°C. 120 g. of ethylidenenorbornene was fed in over a 10 minute period and the batch was heated to 100°C and agitated for 4½ hours.

The batch was worked up as described in Example I and gave 146 g. of crude esters.

The crude esters were purified by vacuum distillation as described in Example II and gave 125.3 g. (75.3% of theory), B.P. 69–71°C/6 mm., of desired product, 13.3 g. of fractions, B.P. 38–76°C/6 mm. and 11.5 g. of residue. The product analyzed as follows:

| | |
|---|---|
| Saponification value | 327.3 |
| $n_D^{20}$ | 1.4713 |

VPC (150°C, 20 M column) showed 4 components as follows:

1. 7.9%, 2. 62.0%, 3. 10.8%, 4. 19.3%

The product has a green, fatty, spicy, wood-camphoraceous, coriander like odor.

The IR-spectrum (neat) shows a strong band at 5.80$\mu$ typical of a carbonyl absorption, and a broad band in the 8.5$\mu$ region for formate. The N.M.R. (60 mec CDCl$_3$) shows the expected signals.

EXAMPLE VII

6-Ethyltricyclo (2.2.1.0$^{2.6}$) hept-3-yl and 5-Ethylnorborn-2 and 3-yl Acetates.

100.0 g. of a mixture of 6-ethyltricyclo (2.2.1.0$^{2.6}$) hept-3-yl and 5-ethylidenenorborn-2 and 3-yl acetates, prepared as described in Example I, and 10 g. Raney nickel catalyst were hydrogenated at 78°C and 40–50 lb. hydrogen pressure for 2½ hours in a Paar shaker, at which time no more hydrogen was absorbed. The hydrogen absorbed corresponded to 0.298 mole of hydrogen and the batch was 54% hydrogenated, which corresponded to the hydrogenation of the 5-ethylidenenorborn-2 and 3-yl acetates to the corresponding 5-ethylnorborn-2 and 3-yl acetates.

To test the completion of hydrogenation, the batch was filtered, 5 g. of palladium (5% on carbon) was added and the batch was hydrogenated an additional 2 hours at 78°C and 50 lb. hydrogen pressure. No additional hydrogen was absorbed.

The catalyst was removed by filtering and the crude, 99 g., was vacuum distilled at 6 mm. using a 37 cm. column packed with glass helices. There was obtained 95 g., (94% of theory), B.P. 79°–83°C/6 mm. of desired product, 2.8 g. fractions, B.P. 76°–85°C/6 mm. and 1.0 g. of residue.

The product analyzed as follows:

| | |
|---|---|
| Saponification value | 299.1 |
| $n_D^{20}$ | 1.4607 |
| Sp. Gr. 25°C/25°C | 0.9925 |

VPC (150°C, SE 30 column) showed 5 components as follows:

1. 9.7%, 2. 30.0%, 3. 36.6%, 4. 15.8%, 5. 7.9%

The odor of the product is spicy, suggestive of anise, woody-pine-camphoraceous with a thujone character.

The IR-spectrum (neat) shows a strong band at 5.75$\mu$ typical of a carbonyl absorption and a broad band in the 8.1$\mu$ region for acetate. The N.M.R. (60 mec CDCl$_3$) shows the expected signals.

EXAMPLE VIII

6-Ethyltricyclo (2.2.1.0$^{2.6}$) hept-3-yl and 5-Ethylnorborn-2 and 3-yl Propionates.

233 g. of a mixture of 6-ethyltricyclo (2.2.1.0$^{2.6}$) hept-3-yl and 5-ethylidenenorborn-2 and 3-yl propionates, prepared as described in Examples II, and 5 g. of 5% palladium on carbon were hydrogenated at 60°–70°C, 40–50 lb. hydrogen pressure using a Paar shaker was added. The hydrogenation was conducted for 5 hours at which time the hydrogenation was completed. The hydrogen absorbed corresponded to 1.04 moles hydrogen and the batch was 86% hydrogenated, which corresponded to the hydrogenation of 5-ethylidenenorborn-2 and 3-yl propionates to the corresponding 5-ethylnorborn-2 and 3-yl propionates. The batch was filtered, the filter cake was washed with benzene and the benzene was removed under reduced pressure. The crude, 233 g., was vacuum distilled at 6 mm. using a 37 cm column packed with glass helices. There was obtained 231.7 g. (97.6% of theory), B.P. 99°–101°C/6 mm. of desired product, 0.8 g., B.P.

90°–105°C/6 mm. and 0.5 g. residue. The product analyzed as follows:

| | |
|---|---|
| Saponification value | 285.7 |
| $n_D^{20}$ | 1.4592 |
| Sp. Gr. | 0.9771 |

VPC (175°C, SE 30 column) showed 5 components as follows:

1. 4.2%, 2. 14%, 3. 33.3%, 4. 27.1%, 5. 21.4%

The IR-spectrum (neat) shows a strong band at 5.75$\mu$ typical of a carbonyl absorption and a broad band in the 8.4$\mu$ region for propionates. The N.M.R. (60 mec CDCl$_3$) shows the expected signals.

The product possesses a green fruity, woody green odor with a note of anise. The odor is similar to the odor of the propionates of Example II but softer and less green in character.

EXAMPLE IX

6-Ethyltricyclo (2.2.1.0$^{2.6}$) heptan-3-ols and 5-Ethylidenenorbornan-2 and 3-ols.

100 g. of a mixture of 6-ethyltricyclo (2.2.1.0$^{2.6}$) hept-3-yl and 5-ethylidenenorborn-2 and 3-yl acetates, as prepared in Example I, 200 g. methanol and 137 g. of aqueous 45% potassium hydroxide were agitated and refluxed (77°C) for 8 hours. 200 ml. of water was added and the methanol was distilled off to a pot temperature of 90°C. 100 ml. of benzene was added and the bottom aqueous layer was separated and extracted 2 times with 50 ml. of benzene. The combined oilbenzene extracts were washed neutral with water and the benzene was removed under reduced pressure. The residual crude alcohols mixture, 75 g., was vacuum distilled at 6 mm. using a 37 cm column packed with glass helices. There was obtained 70.6 g. (92.5% of theory) B.P. 82°–85°C/6 mm. of desired product, 1.5 g. of fractions B.P. 73°–87°C/6 mm., and 2.0 g. residue. The product analyzed as follows:

| | |
|---|---|
| Saponification value (after acetylation) | 306.7 |
| $n_D^{20}$ = 1.4975 | |

VPC (150°C, 20 M column) showed 5 components as follows:

1. 11.1%, 2. 35.1%, 3. 3.0%, 4. 40.5%, 5. 10.3%

The product has a smooth, green, woody, and camphoraceous odor.

The IR-spectrum (neat) shows a strong band at 3.00$\mu$ typical of alcohol abosrption and a broad band in the 9.5$\mu$ region for secondary alcohol. The N.M.R. (60 mec CDCl$_3$) shows the expected signals.

EXAMPLE X

6-Ethyltricyclo (2.2.1.0$^{2.6}$) heptan-3-ols and 5-Ethylnorbornan-2 and 3-ols.

Hydrogen was added to a mixture of 86.0 g. of ethyltricyclo (2.2.1.0$^{2.6}$) heptan-3-ols and 5-ethylidenenorbornan-2 and 3-ols, prepared as described in Example IX, and 2.0 g. palladium (5% on carbon) in a stainless steel vessel using a Paar shaker at 60°C and 40–50 lb. hydrogen pressure. The hydrogenation was complete in 5 hours. The hydrogen absorbed was 0.37 moles of hydrogen, 61% hydrogenation, which corresponds to the hydrogenation of the 5-ethylidenenorbornanols to 5-ethylnorbornanols.

The batch was filtered and the crude alcohols mixture was distilled at 5 mm. using a 37 cm. column packed with glass helices. There was obtained 82.2 g. (94% of theory), B.P. 80°–82°C/5 mm. of desired product, 1.8 g. B.P. 76°–84°C/5 mm. of fractions and 1.5 g. residue. The product analyzed as follows:

| | |
|---|---|
| Saponification value after acetylation | 302.5 |
| $n_D^{20}$ | 1.4825 |

VPC (175°C, 20 M column) showed 4 components as follows:

1. 7.0%, 2. 26.6%, 3. 48.2%, 4. 18.2%

The product possesses a green, woody and minty odor.

The IR-spectrum (neat) shows a strong band at 2.9$\mu$ typical of alcohol absorption and a broad band in the 9.5$\mu$ region for secondary alcohol. The N.M.R. (60 mec CDCl$_3$) shows the expected signals.

EXAMPLE XI

6-Ethyltricyclo (2.2.1.0$^{2.6}$) heptan-3-one and 5-Ethylnorbornan-2 and 3-ones.

175 g. of a mixture of ethyltricyclo (2.2.1.0$^{2.6}$) heptan-3-ols and 5-ethylnorbornan-2 and 3-ols, prepared as described in Example X, 155 g. sodium dichromate and 1135 g. water were agitated and heated to 50°C. 326 g. of 62½% sulfuric acid was fed in over a 30 minute period with cooling. The batch was agitated at 50°C for 4 hours. 100 ml. of benzene was added and the layers separated. The aqueous acid layer was extracted 2 times with 100 ml. of benzene. The oil-benzene extracts were combined and washed with 50 ml. of water, neutralized with 10% sodium bicarbonate and washed neutral with water. The benzene was removed under reduced pressure leaving 156 g. of crude ketones. The crude ketones mixture was vacuum distilled using a 37 cm. column packed with glass helices. There was obtained 113.2 g. (65.5% of theory) B.P. 59°–62°C/4 mm. of desired product, 1.8 g., B.P. 53°–100°C/4 mm. of fractions, 13.5 g., B.P. 83°–98°C/0.5 mm., of fractions and 26.0 g. residue. The product analyzed as follows:

| | |
|---|---|
| Carbonyl value | 391.8 |
| $n_D^{20}$ | 1.4732 |

VPC (175°C, 20 M column) shows 5 components as follows:

1. 0.9%, 2. 13.8%, 3. 82.6% 4. 2.0% 5. 0.7%

The product possesses an interesting strong, green woody odor.

The IR-spectrum (neat) shows a strong band at 5.7$\mu$ typical of a carbonyl absorption. The N.M.R. (60 mec. CDCl$_3$) shows the expected signals.

EXAMPLE XII

The mixture of 6-ethyltricyclo (2.2.1.0$^{2.6}$) hept-3-yl and 5-ethylidenenorborn-2 and 3-yl acetates, Example I, has a green, fruity, slightly fatty odor and was found to blend well with pine notes, such as bornyl and isobornyl acetates. Said mixture of acetates was incorporated into the following pine scent formation to the extent of 3% by weight:

| | |
|---|---|
| Bornyl acetate | 144.0 |
| Copaiba oil | 82.0 |
| Fir balsam | 131.0 |
| $\beta$-Ionone | 7.0 |
| Isobornyl acetate | 400.0 |
| Labdanum absolute | 10.0 |

| -Continued | |
|---|---|
| Lavander oil | 41.0 |
| Linalool | 70.0 |
| Linalyl acetate | 33.0 |
| Patchouli oil | 8.0 |
| Isocamphylcyclohexanol | 33.0 |
| Vanillin 10% in diethyl phthalate | 3.0 |
| Ylang bourbon | 8.0 |
| Acetates, Example I | 30.0 |
| | 1000.0 |

The incorporation of the acetates of Example I into the above pine perfume gas added lift and produced an interesting and original note which was a material improvement over the fragrance without these acetates. The acetates of Example I may be used from 0.1 to 10% in most perfume compositions and higher concentrations, greater than 50%, in order to obtain special effects.

EXAMPLE XIII

The mixture of 6-ethyltricyclo $(2.2.1.0^{2.6})$ hept-3-yl and 5-ethylidenenorborn-2 and 3-yl propionates, Example II, has a fresh green woody odor with a slightly fruity character. These propionate esters were found to blend well with heliotropin and anisic aldehyde notes and were incorporated into the following heliotrope base to the extent of 1% by weight:

| Anisic aldehyde | 10 |
|---|---|
| Diethyl phthalate | 500 |
| Geraniol | 20 |
| Heliotropin | 250 |
| Musk xylol | 10 |
| Orange oil | 20 |
| Peru balsam | 20 |
| Rose otto Bulgarian | 10 |
| Vanillin | 150 |
| Propionates, Example II | 10 |
| | 1000 |

The use of the propionates, Example II, in the above formulation enhanced and brightened the floral character of the fragrance and produced a pleasing effect which was not obtained when these propionates were omitted.

The propionate esters may be used from 0.1 to 10% in most perfume compositions; however, higher concentrations may be used to produce special effects.

EXAMPLE XIV

The mixture of 6-ethyltricyclo $(2.2.1.0^{2.6})$ hept-3-yl and 5-ethylnorborn-2 and 3-yl propionates, Example VIII, has a soft woody odor with a slightly green fruity character and blends well in perfume formulations. The propionate esters were incorporated in the following Jasmin perfume to the extent of 5% by weight:

| Hydroxycitronellal-methylantrranilate Schiff base, 10% in diethyl phthalate | 19 |
|---|---|
| Benzyl acetate | 190 |
| Cananga oil | 30 |
| p-Cresylphenyl acetate, 1% in diethyl phthalate | 19 |
| Hexylcinnamic aldehyde | 65 |
| Hydroxycitronellal | 105 |
| Linalool | 220 |
| Musk ambrette | 21 |
| Phenylethyl alcohol | 200 |
| Isocamphylcyclohexanol | 43 |
| Undecalactone, 10% in diethyl phthalate | 19 |
| Ylang bourbon | 19 |
| Propionate esters, Example VIII | 50 |
| | 1000 |

The presence of the propionate esters of Example VIII in the above Jasmin formulation contributes a very pleasant fruity, woody character to the top note which is a material improvement over the formulation without the propionates. These propionate esters may normally be used from 0.1 to 10% in most perfume compositions. They may be used in higher concentrations where special effects are desired.

EXAMPLE XV

The mixture of 6-ethyltricyclo $(2.2.1.0^{2.6})$ heptan-3-ols and 5-ethylidenenorbornan-2 and 3-ols, Example IX, and the mixture of 6-ethyltricyclo $(2.2.1.0^{2.6})$ heptanols and 5-ethylnorbornan-2 and 3-ols, Example X, have similar strong, green, woody odors and are valuable perfume materials. They blend well with formulations containing coumarins and amyl salicylate.

The above alcohols of Examples IX and X were formulated in the following Fougere base to the extent of 5% by weight:

| Amyl salicylate | 121 |
|---|---|
| Benzyl acetate | 364 |
| Bergamot oil | 242 |
| Coumarin | 121 |
| Lavender oil | 12 |
| Linalyl acetate | 12 |
| Must ambrette | 24 |
| Oak moss, 10% in diethyl phthalate | 12 |
| Patchouli oil | 6 |
| Isocamphylcyclohexanol | 24 |
| Vanillin, 10% in diethyl phthalate | 12 |
| Alcohols, Example IX or alcohols Example X | 50 |
| | 1000 |

The use of the alcohols, Example IX or the alcohols of Example X in the above Fougere base added strength and lift to the fragrance while producing an interesting and original woody note. This interesting odor effect would be difficult to produce by the use of the existing perfume materials.

Th alcohols may be used from 0.1 to 10% in perfume compositions.

EXAMPLE XVI

The mixture of ketones, 6-ethyltricyclo $(2.2.1.0^{2.6})$ heptan-3-one and 5-ethylnorbornan-2 and 3-ones, Example XI, has a powerful green woody odor and blends well with carvones, coumarins and amyl salicylate. The ketones were formulated in the following Fougere base to the extent of 2% by weight:

| Amyl salicylate | 124 |
|---|---|
| Benzyl acetate | 345 |
| Bergamot oil | 230 |
| 1-Carvone | 60 |
| Coumarin | 124 |
| Lavender oil | 12 |
| Linalyl acetate | 11 |
| musk ambrette | 23 |
| Oak moss, 10% in diethyl phthalate | 11 |
| Patchouli oil | 5 |
| Isocamphylcyclohexanol | 23 |
| Vanillin, 10% in diethyl phthalate | 12 |
| Ketones, Example XI | 20 |
| | 1000 |

The incorporation of the ketones, Example XI, into the above Fougere base added body and strength to the fragrance and enhanced the carvone note. The fragrance without the ketones is not pleasing nor strong, as is the one containing the ketones. The ketones may be used in concentrations varying from 0.1 to 10% in perfume compositions.

The materials made in accordance with Examples III to VII, inclusive, may be substituted for the other esters of this invention in the formulations set forth in Examples XII to XIV, with substantially the same results, it being understood that each of the esters imparts its own characteristic nuance to the formulation.

The materials made in accordance with Examples III to VII, inclusive, may be used in amounts from about 0.1 to 10%, by weight, of the perfume formulations. If desired, greater amounts, for example, around 50%, or even higher, on the same basis, may be used.

What is claimed is:

1. A compound having the formula:

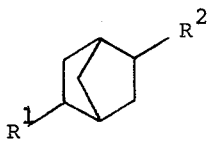

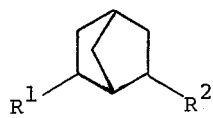, or

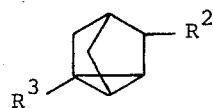, wherein
$R^1$ is an ethylidene radical;
$R^2$ is a member selected from the group consisting of an acyloxy radical derived from an alkanoic acid containing up to 5 carbon atoms, and a hydroxyl radical.
$R^3$ is an ethyl group;
and mixtures of said compounds.

2. A mixture in accordance with claim 1, of (a) a compound where $R^2$ is acetoxy and $R^3$ is ethyl, (b) a compound where $R^1$ is ethylidene and $R^2$ is 2-acetoxy and (c) a compound where $R^1$ is ethylidene and $R^2$ is 3-acetoxy.

3. A compound in accordance with claim 1, in the endo form, wherein $R^1$ is ethylidene and $R^2$ is 3-acetoxy.

4. A compound in accordance with claim 1, in the exo form, wherein $R^1$ is ethylidene and $R^2$ is 3-acetoxy.

5. A compound in accordance with claim 1, wherein $R^1$ is ethylidene and $R^2$ is 2-acetoxy.

6. A mixture in accordance with claim 1 of (a) a compound wherein $R^2$ is propionyloxy and $R^3$ is ethyl, (b) a compound wherein $R^1$ is ethylidene and $R^2$ is 2-propionyloxy, and (c) a compound wherein $R^1$ is ethylidene and $R^2$ is 3propionyloxy, all of said compounds being present in the endo and exo forms.

7. A mixture in accordance with claim 1 of (a) a compound wherein $R^2$ is butyryloxy and $R^3$ is ethyl, (b) a compound wherein $R^1$ is ethylidene and $R^2$ is 2-butyryloxy, and (c) a compound wherein $R^1$ is ethylidene and $R^2$ is 3-butyryloxy, all of said compounds being present in the endo and exo forms.

8. A mixture in accordance with claim 1 of (a) a compound wherein $R^2$ is isobutyryloxy and $R^3$ is ethyl, (b) a compound wherein $R^1$ is ethylidene and $R^2$ is 2-isobutyryloxy, and (c) a compound wherein $R^1$ is ethylidene and $R^2$ is 3-isobutyryloxy.

9. A mixture in accordance with claim 1 of (a) a compound wherein $R^2$ is $(CH_3)_3 CCOO-$ and $R^3$ is ethyl, (b) a compound wherein $R^1$ is ethylidene and $R^2$ is 2-$CH_3)_3 CCOO-$, and (c) a compound wherein $R^1$ is ethylidene and $R^2$ is 3-$(CH_3)_3CCOO-$.

10. A mixture in accordance with claim 1 of (a) a compound wherein $R^2$ is formyl and $R^3$ is ethyl, (b) a compound wherein $R^1$ is ethylidene and $R^2$ is 2-formyloxy, and (c) a compound wherein $R^1$ is ethylidene and $R^2$ is 3-formyloxy.

11. A mixture in accordance with claim 1 of (a) a compound wherein $R^2$ is OH and $R^3$ is ethyl, (b) a compound wherein $R^1$ is ethylidene and $R^2$ is 2-OH, and (c) a compound wherein $R^1$ is ethylidene and $R^2$ is 3-OH.

* * * * *

UNITED STATES PATENT OFFICE
CERTIFICATE OF CORRECTION

Patent No. 3,860,635　　　　　　　　Dated January 14, 1975

Inventor(s) Garry C. Kitchens

It is certified that error appears in the above-identified patent and that said Letters Patent are hereby corrected as shown below:

Column 6, line 60, "bornanone" should read -- one --.

Signed and sealed this 24th day of June 1975.

(SEAL)
Attest:

RUTH C. MASON
Attesting Officer

C. MARSHALL DANN
Commissioner of Patents
and Trademarks